(12) United States Patent
Lee et al.

(10) Patent No.: US 11,006,020 B2
(45) Date of Patent: May 11, 2021

(54) CONTROL CAPTURE OF EXECUTION SCREEN

(71) Applicant: HEWLETT-PACKARD DEVELOPMENT COMPANY, L.P., Spring, TX (US)

(72) Inventors: Hyeon Seung Lee, Seoul (KR); Hee Jung Kim, Seoul (KR); Kee Chang Lee, Hwaseong-si (KR); Mok Hwa Lim, Suwon-si (KR)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 16/612,163

(22) PCT Filed: Feb. 27, 2018

(86) PCT No.: PCT/KR2018/002369
§ 371 (c)(1),
(2) Date: Nov. 8, 2019

(87) PCT Pub. No.: WO2019/066165
PCT Pub. Date: Apr. 4, 2019

(65) Prior Publication Data
US 2020/0288042 A1  Sep. 10, 2020

(30) Foreign Application Priority Data

Sep. 29, 2017 (KR) .......................... 10-2017-0128307

(51) Int. Cl.
*H04N 1/44* (2006.01)
*G06F 21/34* (2013.01)
(Continued)

(52) U.S. Cl.
CPC .......... *H04N 1/4433* (2013.01); *G06F 21/34* (2013.01); *G06F 21/608* (2013.01);
(Continued)

(58) Field of Classification Search
CPC ............. H04N 1/0035; H04N 1/00509; H04N 1/4406; H04N 1/4413; H04N 1/444;
(Continued)

(56) References Cited

U.S. PATENT DOCUMENTS 8,826,452 B1   9/2014 He et al.
2011/0043852 A1* 2/2011 Uejo ..................... G06F 3/1238
                                              358/1.15
(Continued)

FOREIGN PATENT DOCUMENTS

JP   2010-003017   1/2010
JP   2011-198256   10/2011
(Continued)

*Primary Examiner* — Chad Dickerson
(74) *Attorney, Agent, or Firm* — Staas & Halsey LLP

(57) ABSTRACT

Provided is an image forming apparatus to control capturing of an execution screen displayed. A memory stores at least one application. A user interface device displays an execution screen of an application, to which a user is logged in with an identification (ID) of the user, and receives an input of capturing the execution screen. A processor determines an authority of the ID of the user to capture the execution screen by comparing a security level of the execution screen set based on the data displayed on the execution screen and a security level of the user set with respect to the ID of the user. The processor, in response to the input, controls the capturing of the execution screen, based on the determined authority of the ID of the first user.

15 Claims, 13 Drawing Sheets

(51) Int. Cl.
*G06F 21/60* (2013.01)
*H04N 1/00* (2006.01)
(52) U.S. Cl.
CPC ..... *H04N 1/00509* (2013.01); *H04N 1/00854* (2013.01); *H04N 1/00875* (2013.01); *H04N 1/444* (2013.01); *H04N 1/4426* (2013.01)
(58) Field of Classification Search
CPC .. H04N 1/4426; H04N 1/4433; G06F 3/1238; G06F 21/34
USPC .............................. 358/1.11–1.18
See application file for complete search history.

(56) References Cited

U.S. PATENT DOCUMENTS

| | | | |
|---|---|---|---|
| 2012/0117660 A1* | 5/2012 | Domany | H04L 9/321 |
| | | | 726/28 |
| 2012/0229842 A1* | 9/2012 | Groves | H04N 1/00347 |
| | | | 358/1.15 |
| 2015/0215494 A1 | 7/2015 | Selvaraj et al. | |
| 2015/0281949 A1 | 10/2015 | Laborde | |
| 2017/0013168 A1* | 1/2017 | Kosaka | H04N 1/00244 |
| 2020/0036863 A1* | 1/2020 | Judd | H04N 1/444 |

FOREIGN PATENT DOCUMENTS

| | | |
|---|---|---|
| KR | 2016-0037457 | 4/2016 |
| KR | 2017-0057321 | 5/2017 |

\* cited by examiner

[Fig. 1]
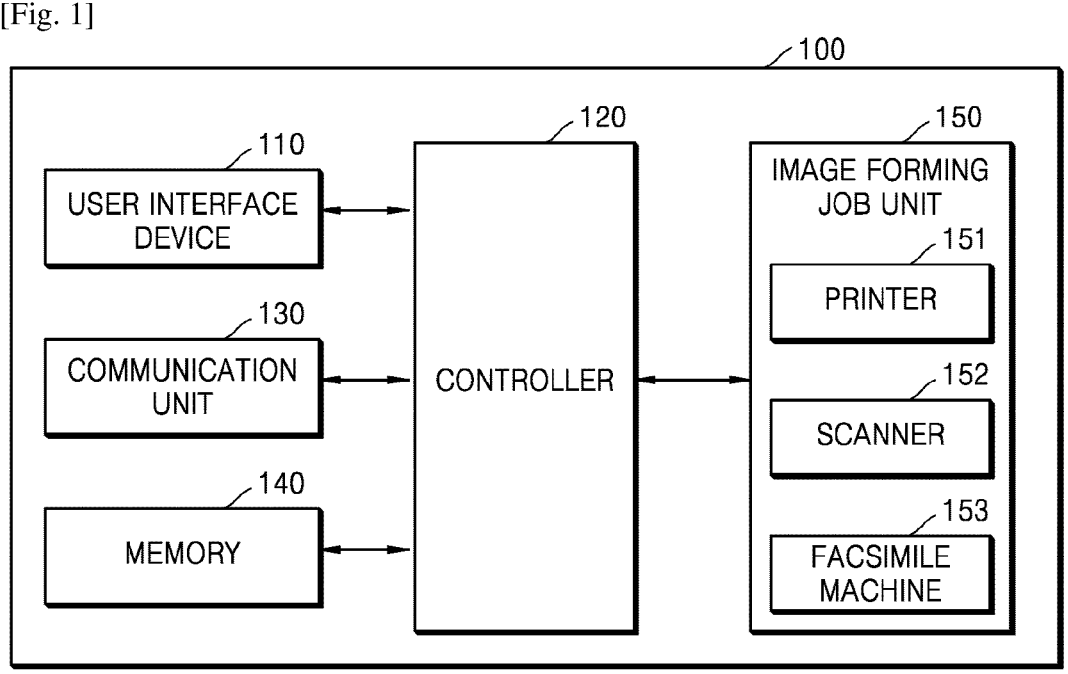

[Fig. 2]
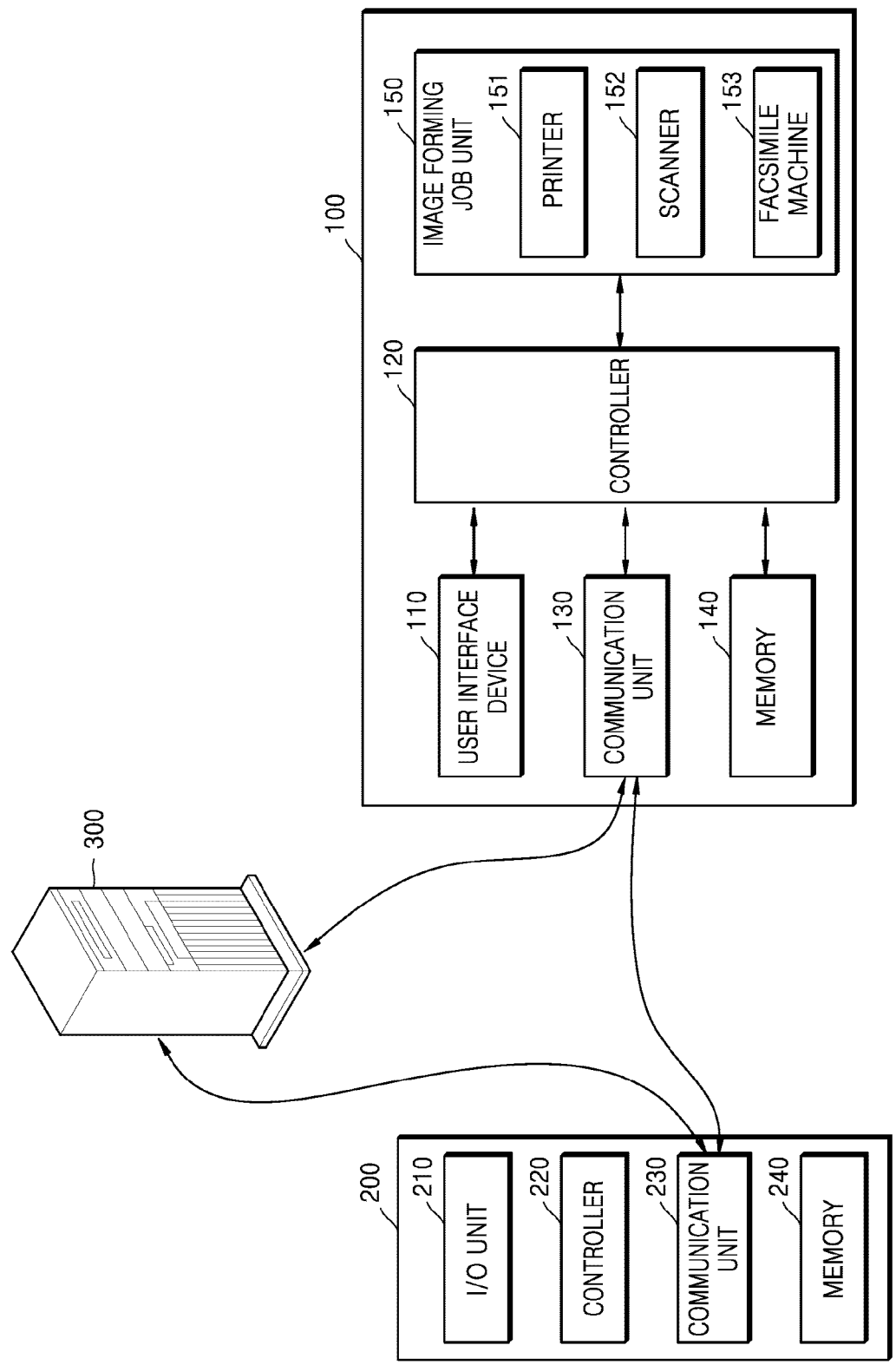

[Fig. 3]
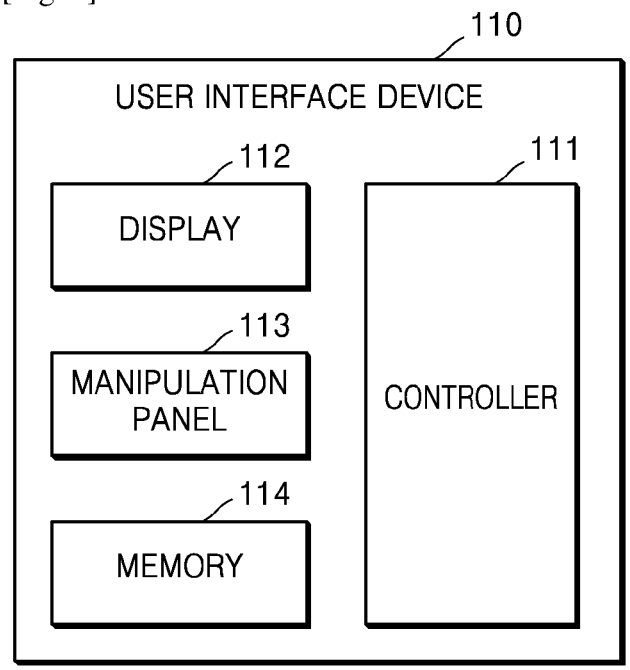
[Fig. 4]
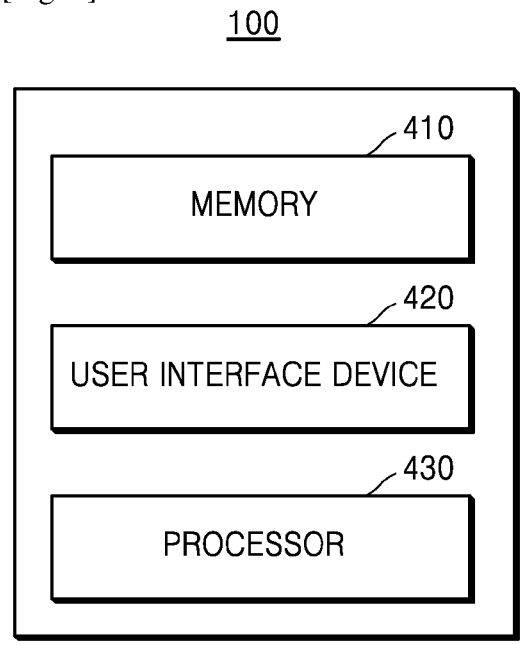

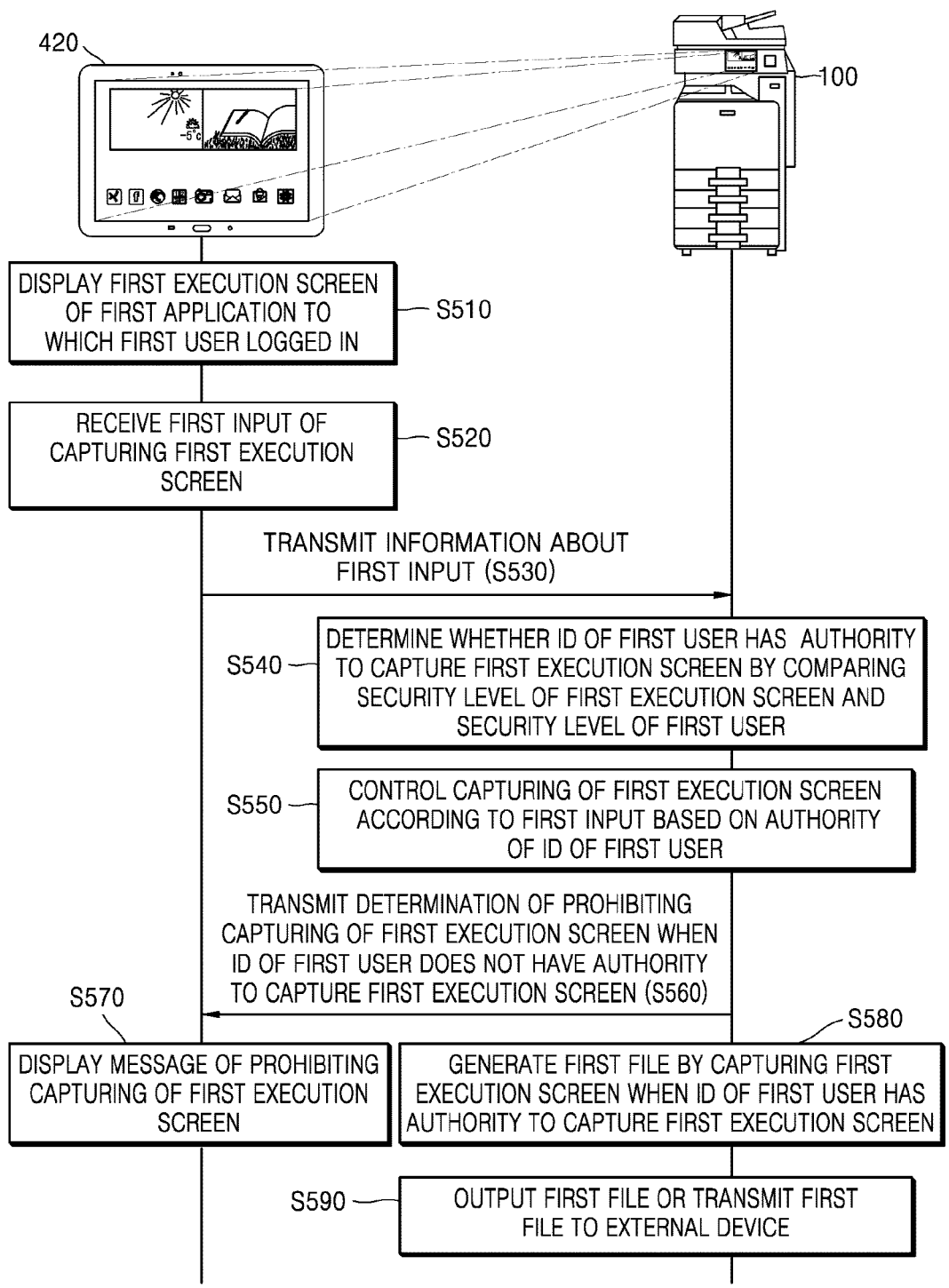

[Fig. 6]
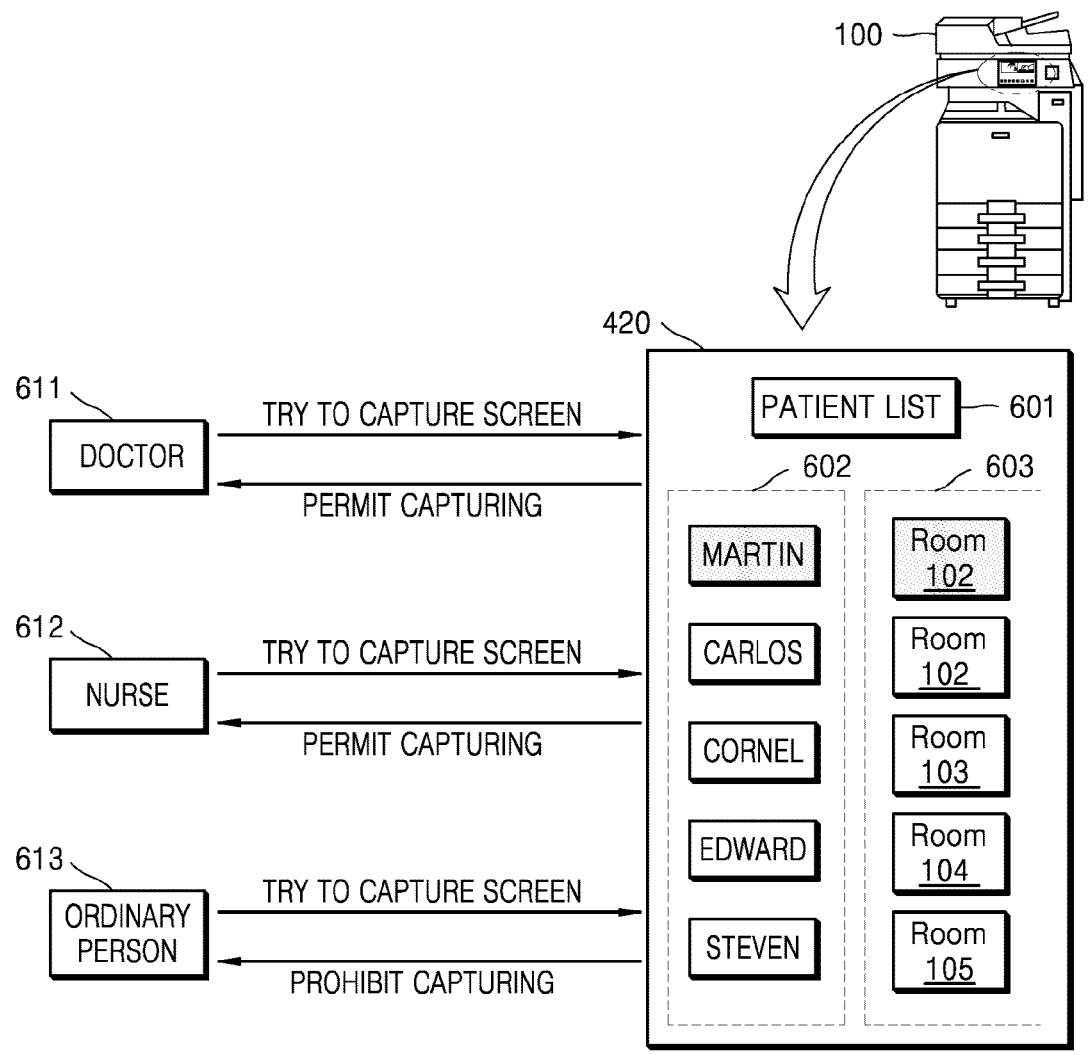

[Fig. 7]
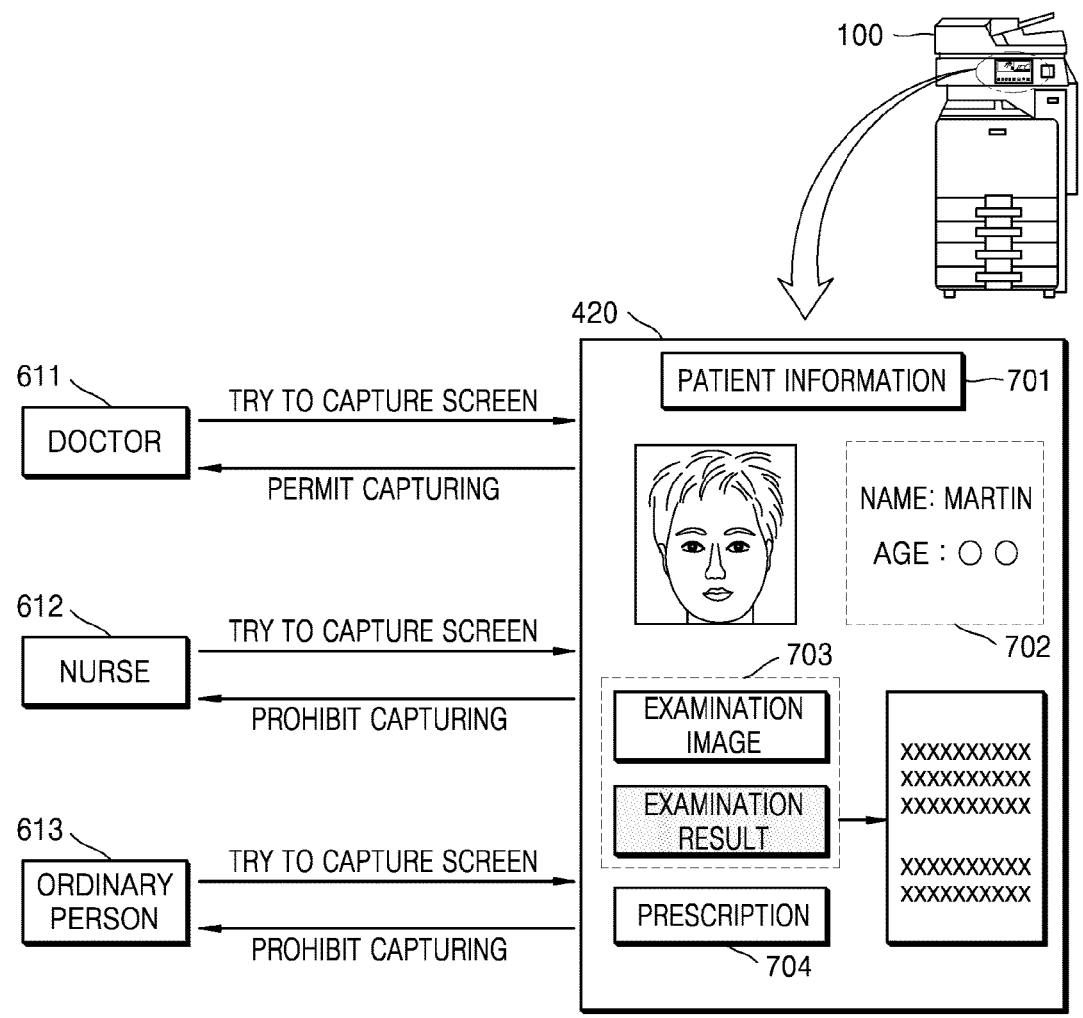

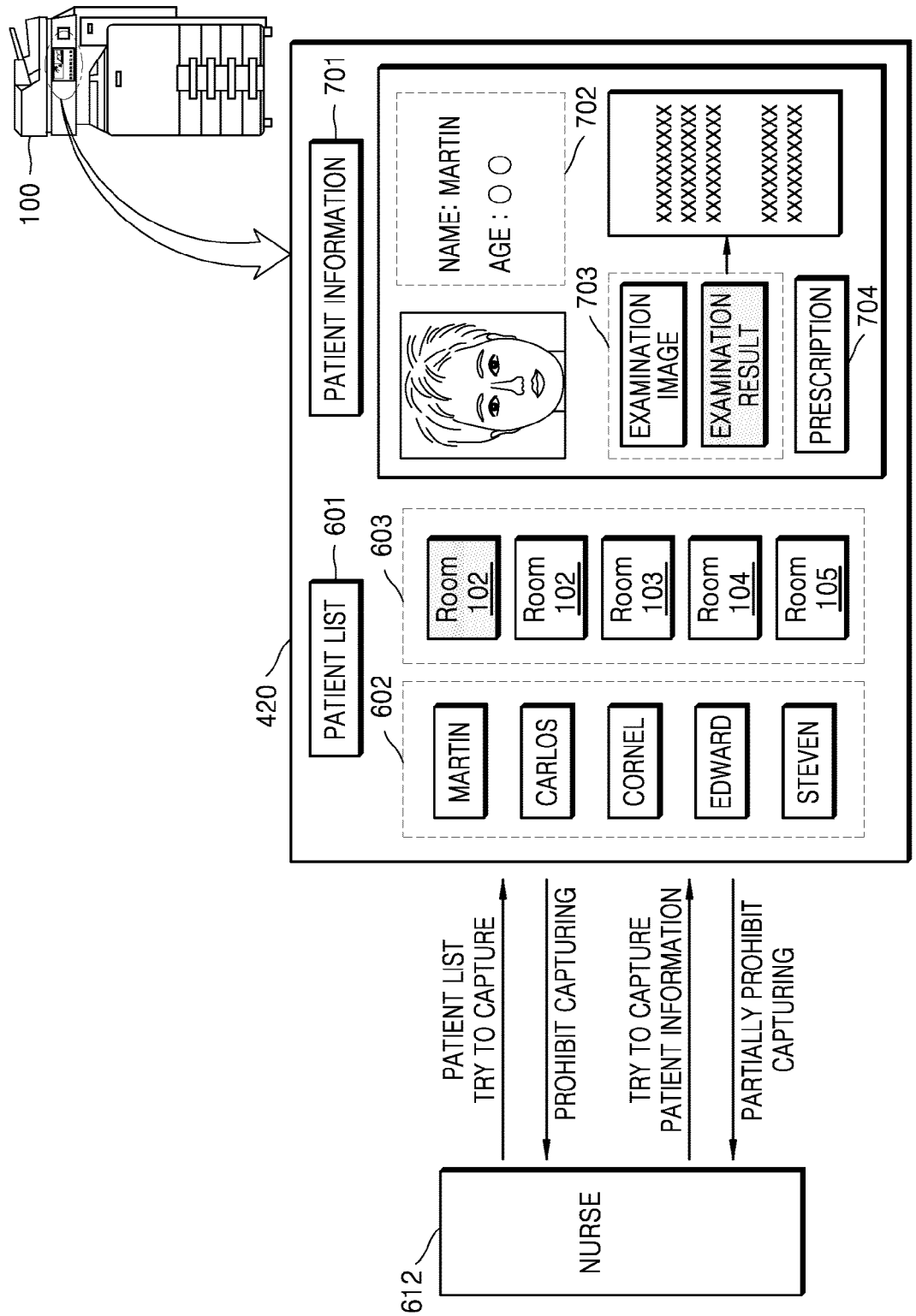

[Fig. 9]
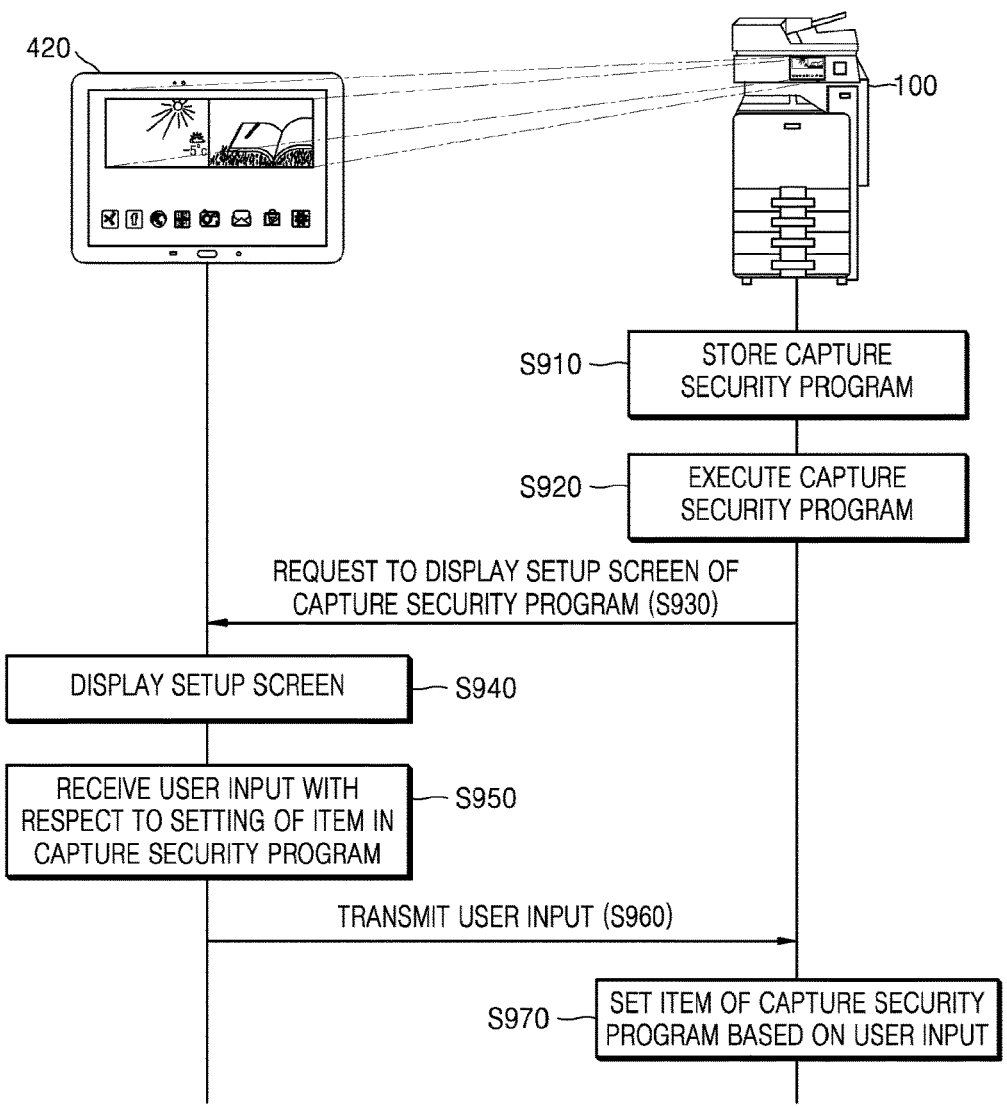
[Fig. 10]
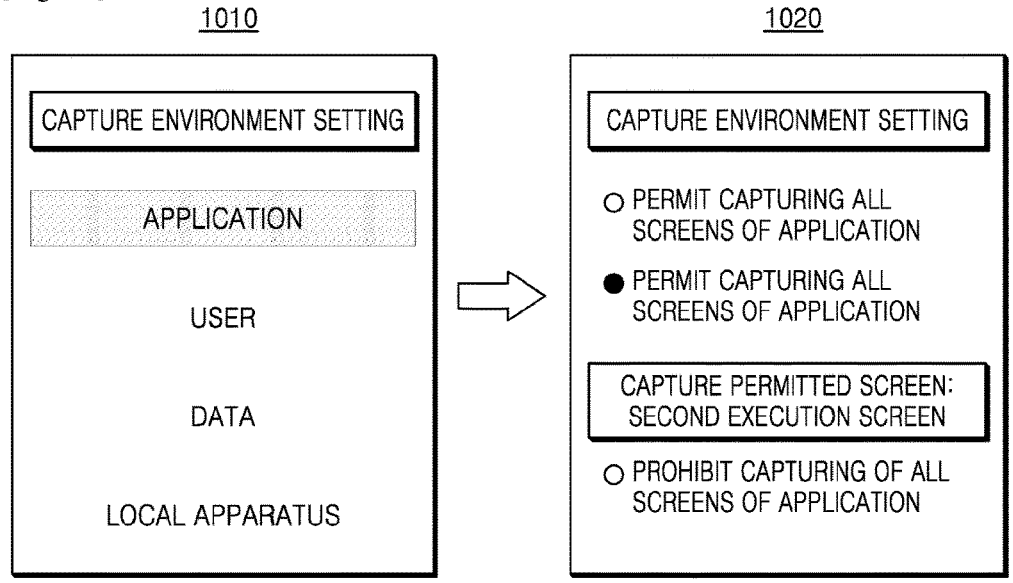

[Fig. 11]
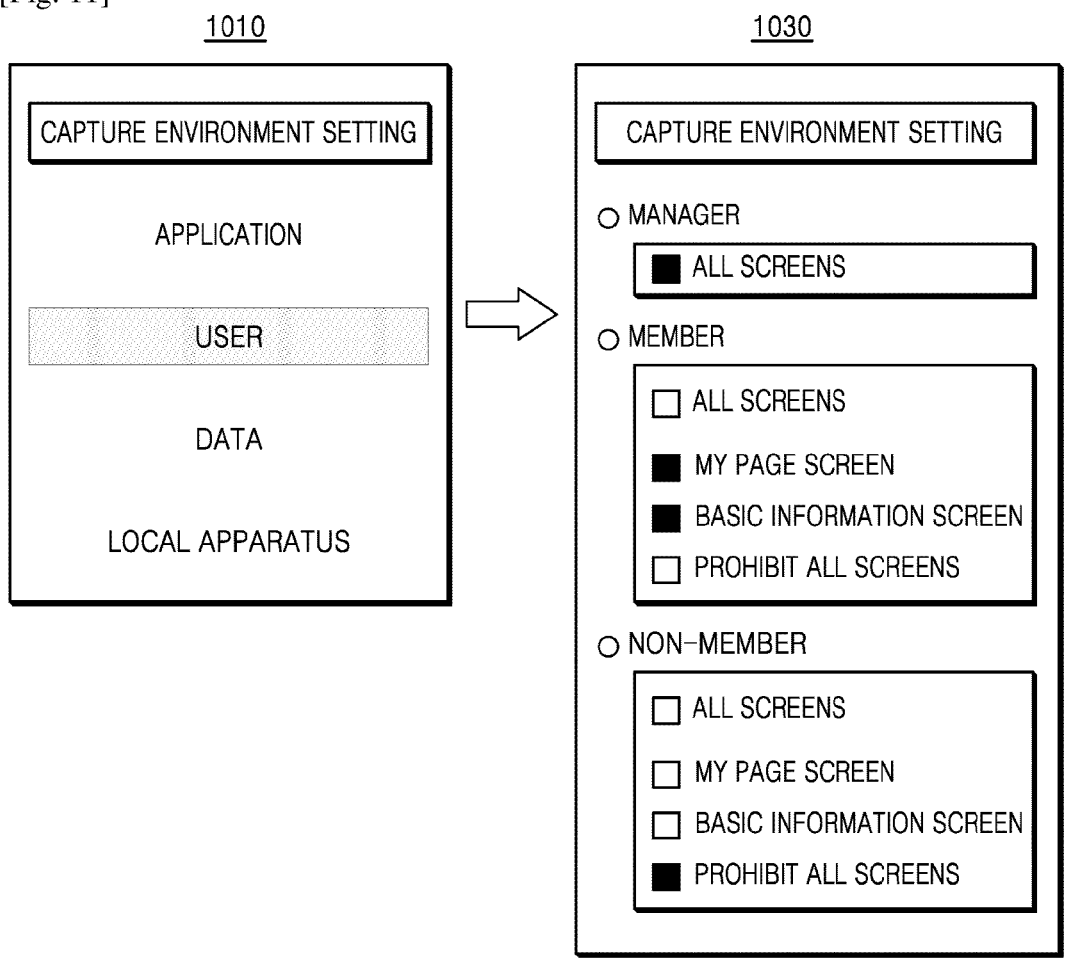

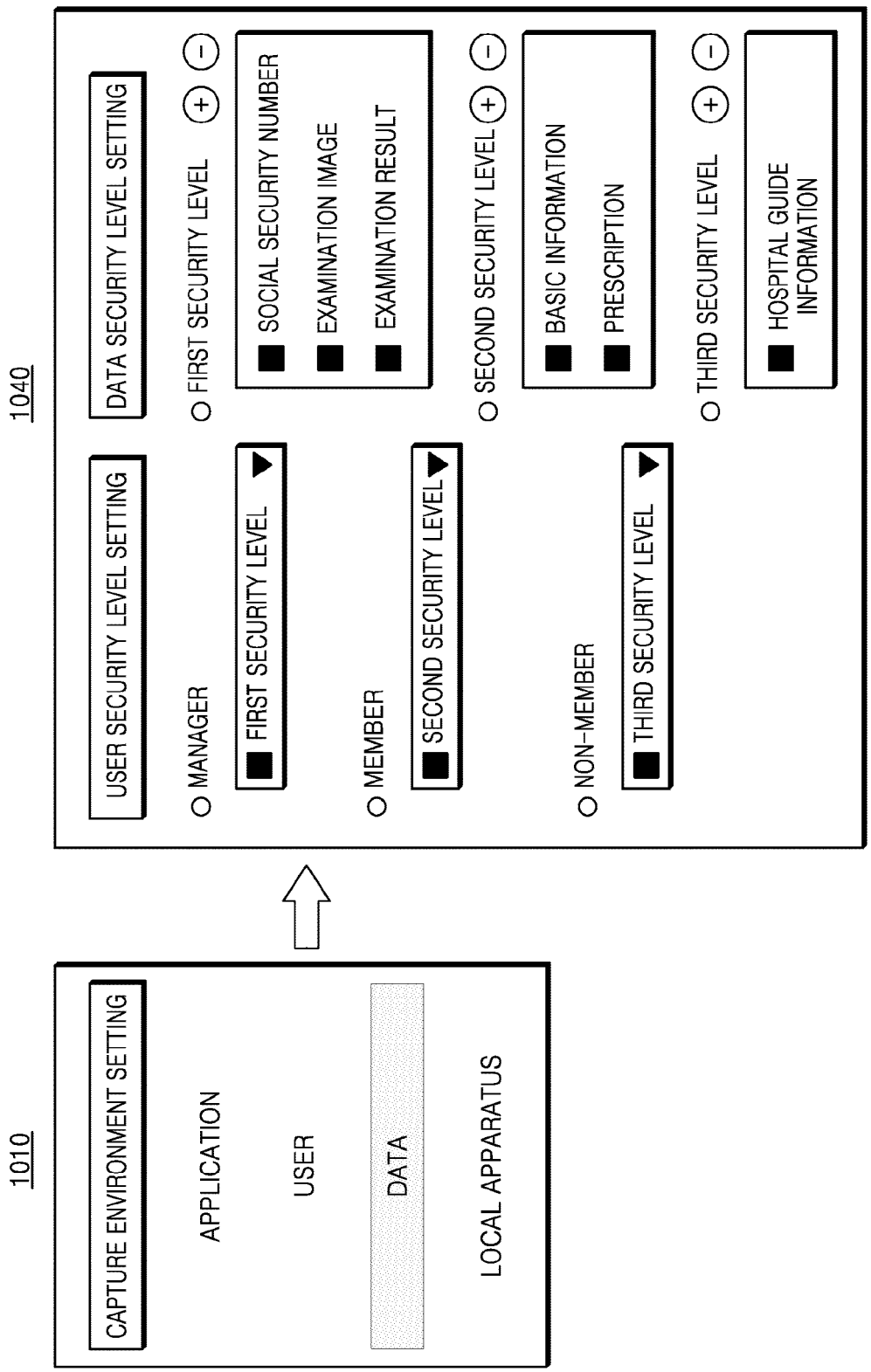
[Fig. 12]

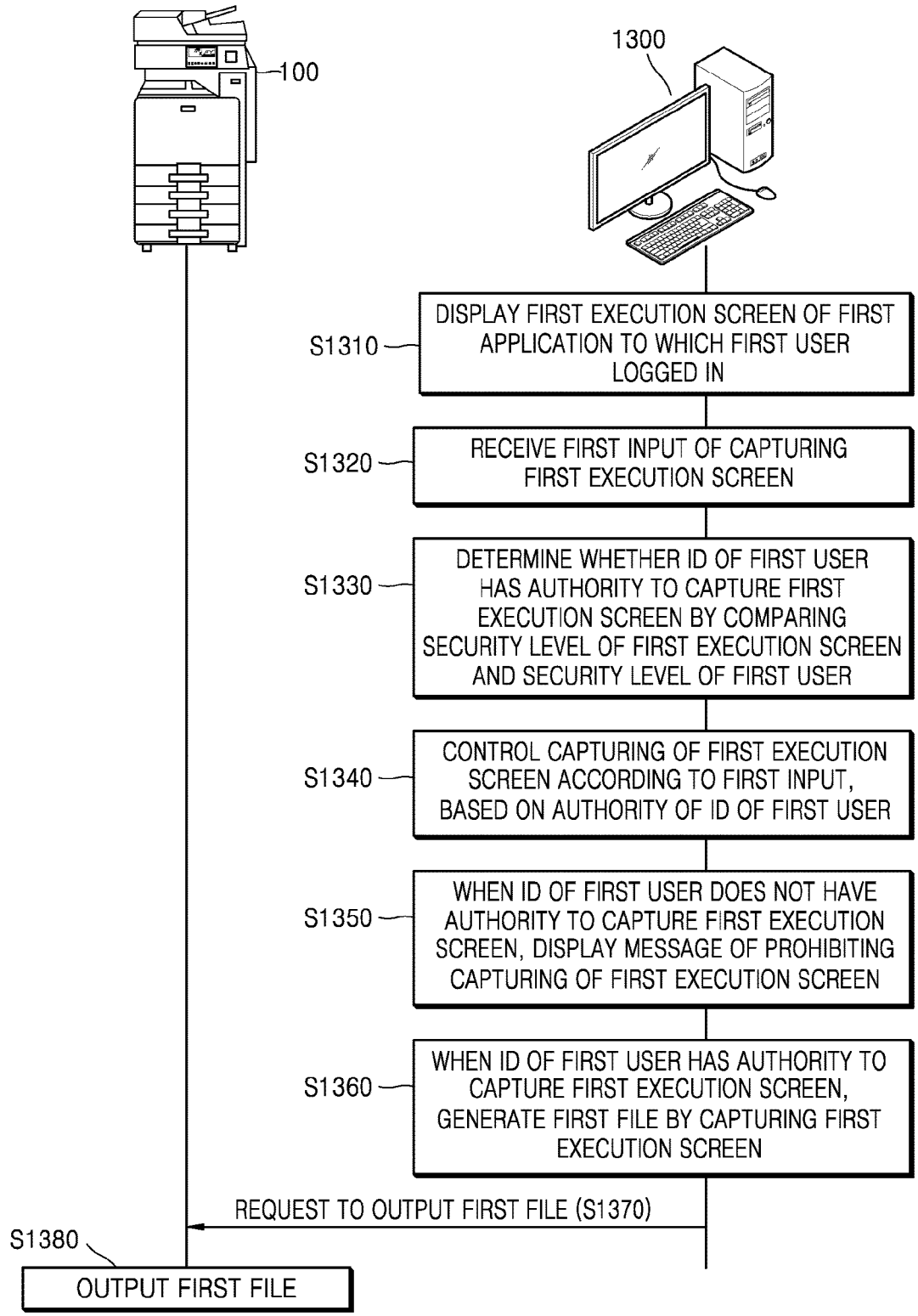

[Fig. 14]
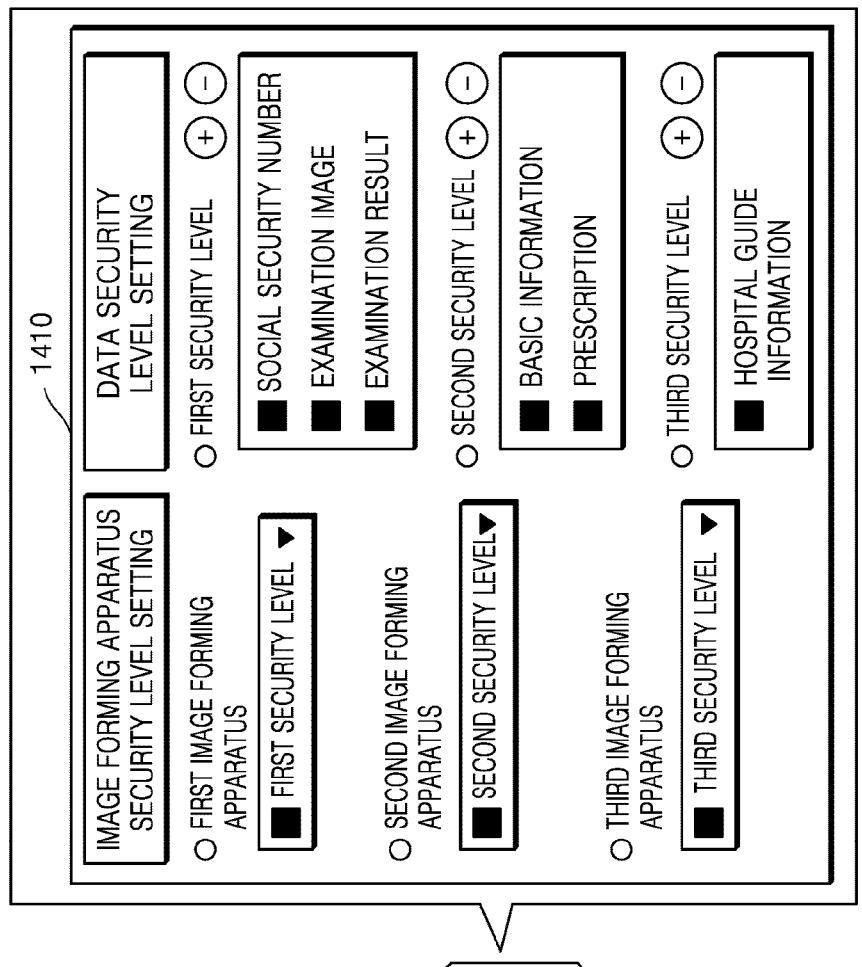
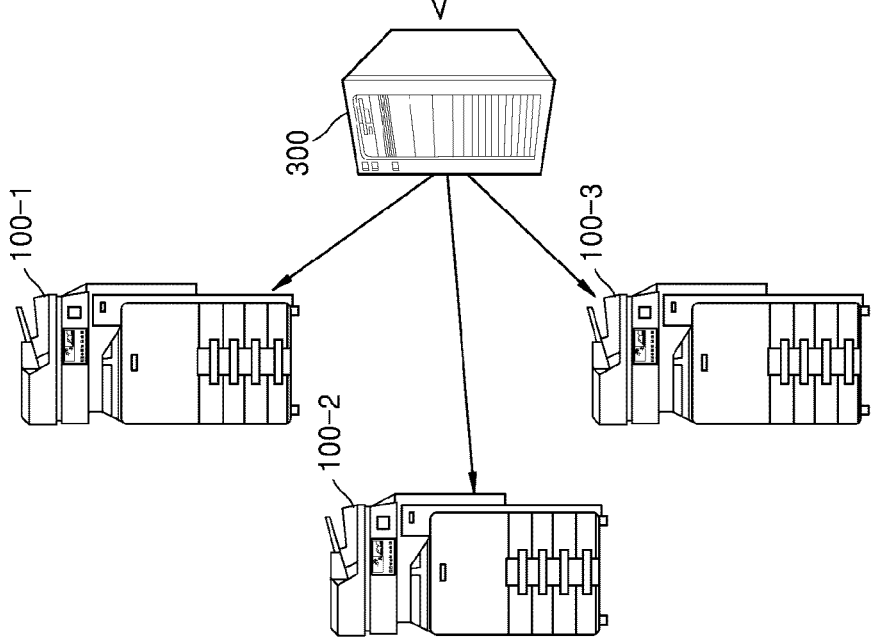

[Fig. 15]
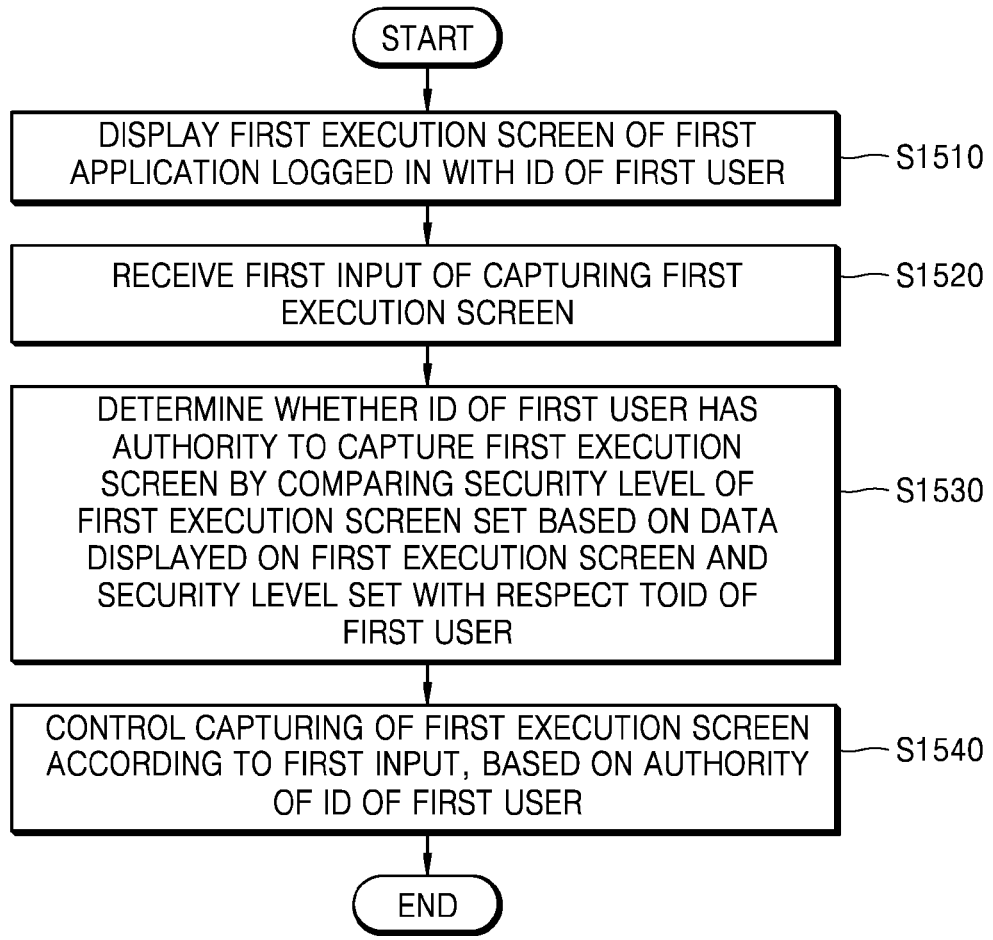
[Fig. 16]
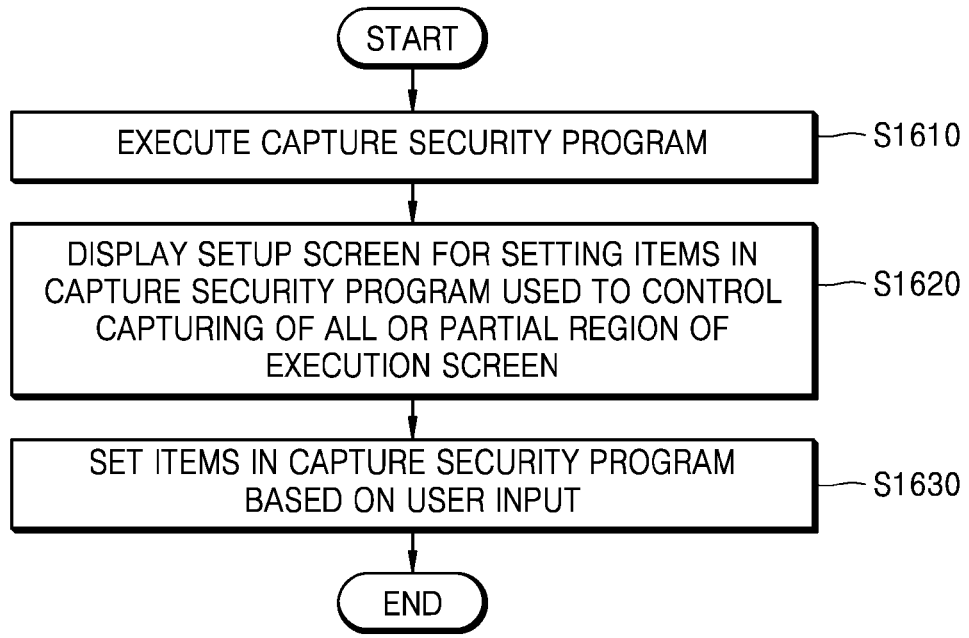

CONTROL CAPTURE OF EXECUTION SCREEN

CROSS REFERENCE TO RELATED APPLICATIONS

This application is filed under 35 U.S.C. § 371 as a PCT national stage of PCT International Application No. PCT/KR2018/002369 filed at the Korean Intellectual Property Office (KIPO) on Feb. 27, 2018, which claims the priority benefit of Korean Patent Application No. 10-2017-0128307 filed on Sep. 29, 2017 at the KIPO. The contents of both the International Application No. PCT/KR2018/002369 and the Korean Patent Application No. 10-2017-0128307 are incorporated by reference herein in their entirety.

BACKGROUND ART

An image forming apparatus may be used in a public place. Although a plurality of users are able to access the image forming apparatus, the image forming apparatus protects personal information of a user using the image forming apparatus.

DISCLOSURE OF INVENTION

Solution to Problem

Provided is an image forming apparatus to control capturing of an execution screen displayed. A memory stores at least one application. A user interface device displays an execution screen of an application, to which a user is logged in with an identification (ID) of the user, and receives an input of capturing the execution screen. A processor determines an authority of the ID of the user to capture the execution screen by comparing a security level of the execution screen set based on the data displayed on the execution screen and a security level of the user set with respect to the ID of the user. The processor, in response to the input, controls the capturing of the execution screen, based on the determined authority of the ID of the first user.

BRIEF DESCRIPTION OF DRAWINGS

The disclosure will be easily understood from the following detailed description, taken in conjunction with the accompanying drawings, wherein reference numerals denote structural elements, in which:

FIG. 1 is a block diagram of a configuration of an image forming apparatus according to an example;

FIG. 2 is a diagram of an image forming apparatus, according to an example, being connected to a user terminal or a server;

FIG. 3 is a block diagram of a detailed configuration of a user interface device according to an example;

FIG. 4 is a block diagram of a configuration of an image forming apparatus according to an example;

FIG. 5 is a diagram for describing processes of controlling, by an image forming apparatus, capturing of an execution screen of an application displayed on a user interface device of the image forming apparatus, according to an example;

FIG. 6 is a diagram for describing processes of controlling, by an image forming apparatus, capturing of an execution screen of an application according to a security level of a user and a security level of data, according to an example;

FIG. 7 is a diagram for describing processes of controlling, by an image forming apparatus, capturing of an execution screen of an application according to a security level of a user and a security level of data, according to another example;

FIG. 8 is a diagram for describing controlling, by an image forming apparatus, capturing of a certain region of an execution screen of an application, according to an example;

FIG. 9 is a diagram for describing processes of setting, by an image forming apparatus, items in a security program controlling screen capturing, according to an example;

FIG. 10 illustrates screens of an image forming apparatus set to control capturing of an execution screen of an application according to the execution screen, according to an example;

FIG. 11 illustrates screens of an image forming apparatus set to control capturing of an execution screen of an application according to users, according to an example;

FIG. 12 illustrates screens of an image forming apparatus set to control capturing of an execution screen of an application according to data, according to an example;

FIG. 13 is a diagram for describing processes of controlling, by a device connectable to an image forming apparatus, capturing of an execution screen of an application displayed on the device, according to an example;

FIG. 14 is a diagram for describing processes of controlling, by a server managing a plurality of image forming apparatuses, capturing of an execution screen of an application of each of the plurality of image forming apparatuses, according to an example;

FIG. 15 is a flowchart of a method of controlling, by an image forming apparatus, capturing of an execution screen of an application displayed on a user interface device of the image forming apparatus, according to an example; and FIG. 16 is a flowchart of a method of setting, by an image forming apparatus, items in a security program for controlling screen capturing, according to an example.

BEST MODE FOR CARRYING OUT THE INVENTION

Provided is an image forming apparatus to control capturing of an execution screen displayed. A memory stores at least one application. A user interface device displays an execution screen of an application, to which a user is logged in with an identification (ID) of the user, and receives an input of capturing the execution screen. A processor determines an authority of the ID of the user to capture the execution screen by comparing a security level of the execution screen set based on the data displayed on the execution screen and a security level of the user set with respect to the ID of the user. The processor, in response to the input, controls the capturing of the execution screen, based on the determined authority of the ID of the first user.

MODE FOR THE INVENTION

Throughout the specification, when a part "includes" or "comprises" an element, unless there is a particular description contrary thereto, the part can further include other elements, not excluding the other elements.

While such terms as "first", "second", etc., may be used to describe various components, such components must not be limited to the above terms. The above terms are used only to distinguish one component from another. For example, a first component may be referred to as a second component, and similarly, a second component may be referred to as a first component without departing from the scope of the disclosure. As used herein, the term "and/or" includes any and all combinations of one or more of the associated listed items.

Throughout the specification, an "image forming job" may denote any one of various jobs (for example, printing, scanning, and faxing) related to an image, such as forming of an image or generating/storing/transmitting of an image file, and a "job" may denote not only an image forming job, but may also denote a series of processes related to perform the image forming job.

Also, an "image forming apparatus" may denote any apparatus capable of performing an image forming job, such as a printer, a scanner, a fax machine, a multi-function printer (MFP), or a display device.

Also, a "user" may denote a person who performs manipulation related to an image forming job by using an image forming apparatus or a device connected to the image forming apparatus wirelessly or via wires. Also, a "manager" may denote a person who has authority to access all functions of an image forming apparatus and to a system. Here, the "manager" and the "user" may be the same person.

The present disclosure will now be described more fully with reference to the accompanying drawings for one of ordinary skill in the art to be able to perform the present disclosure without any difficulty. In this regard, the present examples may have different forms and should not be construed as being limited to the descriptions set forth herein.

Hereinafter, examples will now be described in detail with reference to accompanying drawings.

FIG. 1 is a block diagram of a configuration of an image forming apparatus 100 according to an example.

Referring to FIG. 1, the image forming apparatus 100 according to an example may include a user interface device 110, a controller 120, a communication unit 130, a memory 140, and an image forming job unit 150. Also, although not illustrated, the image forming apparatus 100 may further include a power supply for supplying power to each component.

The user interface device 110 may include an input unit for receiving an input for performing an image forming job from a user, and an output unit for displaying information, such as a result of performing an image forming job or a state of the image forming apparatus 100. For example, the user interface device 110 may include an operation panel for receiving a user input and a display panel for displaying a screen.

In detail, the input unit may include a device for receiving various types of user inputs, such as a keyboard, a physical button, a touch screen, a camera, or a microphone. Also, the output unit may include, for example, a display panel or a speaker. However, the user interface device 110 is not limited thereto, and may include any device supporting various inputs and outputs.

The controller 120 may control overall operations of the image forming apparatus 100, and may include at least one processor, such as a central processing unit (CPU). The controller 120 may control the components included in the image forming apparatus 100 to perform an operation corresponding to a user input received through the user interface device 110. The controller 120 may include at least one specialized processor for each function or may be an integrated processor.

For example, the controller 120 may execute a program stored in the memory 140, read data or a file stored in the memory 140, or store a new file in the memory 140.

The communication unit 130 may communicate with another device or a network via wired or wireless communication. In this regard, the communication unit 130 may include a communication module supporting at least one of various wired/wireless communication methods. For example, the communication module may be in a form of a chipset, or may be a sticker/barcode (for example, a sticker including a near field communication (NFC) tag) containing information for communication.

The wireless communication may include at least one of, for example, wireless fidelity (Wi-Fi), Wi-Fi direct, Bluetooth, ultra wideband (UWB), and NFC. The wired communication may include at least one of, for example, a universal serial bus (USB) and a high definition multimedia interface (HDMI).

The communication unit 130 may be connected to an external device located outside the image forming apparatus 100 so as to transmit or receive a signal or data. Referring to FIG. 2, the image forming apparatus 100 is connected to a user terminal 200 through the communication unit 130. The communication unit 130 may transmit a signal or data received from the user terminal 200 to the controller 120, or transmit a signal or data generated by the controller 120 to the user terminal 200. For example, when the communication unit 130 receives a print command signal and print data from the user terminal 200, the controller 120 may output the received print data through a printer 151.

FIG. 2 is a diagram of the image forming apparatus 100 according to an example being connected to the user terminal 200 or a server 300.

As shown in FIG. 2, the user terminal 200 may include an input/output (I/O) unit 210, a controller 220, a communication unit 230, and a memory 240. The controller 220 may control an image forming job by executing a program stored in the memory 240 and transmitting a signal or data generated as a result to the image forming apparatus 100 through the communication unit 230. The user terminal 200 may include, for example, a smart phone, a tablet personal computer (PC), a PC, a home appliance, a medical device, a camera, or a wearable device.

Meanwhile, the communication unit 130 may be directly connected to the server 300 to transmit or receive signal or data. Also, the communication unit 130 may be connected to the user terminal 200 through the server 300. In other words, the communication unit 130 of the image forming apparatus 100 may transmit or receive a signal or data to and from the communication unit 230 of the user terminal 200 through the server 300.

Referring back to FIG. 1, various types of data, such as programs (for example, applications) and files, may be installed or stored in the memory 140. The controller 120 may access and use the data stored in the memory 140 or store new data in the memory 140. Also, the controller 120 may execute a program stored in the memory 140. Also, the controller 120 may install an application received from an external source through the communication unit 130 in the memory 140.

The image forming job unit 150 may perform an image forming job, such as printing, scanning, or faxing).

Referring to FIG. 1, the image forming job unit 150 includes the printer 151, a scanner 152, and a facsimile machine 153, but the image forming job unit 150 may include only some of them or may further include a component for performing another type of image forming job according to needs.

The printer 151 may form an image on a recording medium via any one of various printing methods, such as an electro-photography method, an inkjet method, a thermal transfer method, and a thermo-sensitive method.

The scanner 152 may irradiate light onto paper and read an image recorded on the paper by receiving light reflected from the paper. A charge-coupled device (CCD) or a contact type image sensor (CIS) may be employed as an image sensor reading the image from the paper. The scanner 152 may have a flatbed structure, a document feed structure, or a combination thereof, wherein, in the flatbed structure, the paper is located at a fixed location and the image is read while the image sensor moves, and in the document feed structure, the image sensor is located at a fixed location and the paper is fed.

In the facsimile machine 153, a component for scanning an image may be shared with the scanner 152, and a component for printing a received file may be shared with the printer 151. The facsimile machine 153 may transmit a scan file to a destination or receive a file from an external source.

Names of the components of the image forming apparatus 100 may be changed. Also, the image forming apparatus 100 may include at least one of the above components, may not include some of the above components, or may further include an additional component.

Meanwhile, the user interface device 110 of FIG. 1 may include an independent control system. In other words, in addition to the controller 120 of the image forming apparatus 100, the user interface device 110 may include a control system (a controller and a memory) for controlling a user interface (UI) provided by the user interface device 110. Also, an operating system (OS) for providing a UI and programs, such as applications, for supporting various functions may be installed in the control system of the user interface device 110.

FIG. 3 is a block diagram of a detailed configuration of the user interface device 110 according to an example. Referring to FIG. 3, the user interface device 110 may include a controller 111, a display 112, a manipulation panel 113, and a memory 114.

As shown in FIG. 3, the user interface device 110 may include an independent control system (the controller 111 and the memory 114) separate from the controller 120. The controller 111 and the memory 114 may control a UI provided by the user interface device 110. The controller 111 may be configured as a processor, such as a CPU, like the controller 120.

The display 112 may be configured as a liquid crystal display (LCD) panel or an organic light-emitting display (OLED) panel, and the manipulation panel 113 may be configured as a physical button or a touch screen.

Meanwhile, the user interface device 110 may be separated from the image forming apparatus 100. For example, the user interface device 110 may operate similar to a tablet when separated from the image forming apparatus 100, and perform input and output functions when combined to the image forming apparatus 100. The user interface device 110 that is detachable may further include a communication unit for communicating with an external device.

FIG. 4 is a block diagram of a configuration of the image forming apparatus 100 according to an example.

The image forming apparatus 100 of FIG. 4 may include a memory 410, a user interface device 420, and a processor 430. However, the components shown in FIG. 4 are not all essential, and the image forming apparatus 100 may include more or less components than those shown in FIG. 4.

The memory 410 of the image forming apparatus 100 of FIG. 4 may identically correspond to the memory 140 of the image forming apparatus 100 of FIG. 1. Also, the user interface device 420 of the image forming apparatus 100 of FIG. 4 may identically correspond to the user interface device 110 of the image forming apparatus 100 of FIG. 1 or 3. Also, the processor 430 of the image forming apparatus 100 of FIG. 4 may identically correspond to the controller 120 of the image forming apparatus 100 of FIG. 1.

The memory 410 may store a program, data, or a file related to the image forming apparatus 100. The processor 430 may execute a program stored in the memory 410, read data or a file stored in the memory 410, or store a new file in the memory 410.

The memory 410 may store at least one application. Also, the memory 410 may store a capture security program controlling capturing of all or a partial region of at least one execution screen from among a plurality of execution screens according to execution of the at least one application. Also, the memory 410 may store information set in the capture security program.

The user interface device 420 denotes a device that receives data for controlling the image forming apparatus 100 from a user. The processor 430 may control a display of the user interface device 420 to generate and output a user interface screen for receiving a certain instruction or data from the user.

The user interface device 420 may display a first execution screen of a first application logged in with identification (ID) of a first user from among the at least one application. The user interface device 420 may receive a first input of capturing the first execution screen.

The processor 430 may determine whether the ID of the first user has authority to capture the first execution screen by comparing a security level of the first execution screen set based on data displayed on the first execution screen and a security level set with respect to the ID of the first user.

Here, data that needs to be selectively secured may be displayed on the first execution screen. The processor 430 may determine a security level of each piece of data displayed on the first execution screen based on service information provided by the first application, and determine a security level of the first execution screen based on first data that has highest security level from the security level of each piece of data.

Also, the processor 430 may determine whether substantive information about the data is actually displayed on the first execution screen while determining the security level of each piece of data displayed on the first execution screen. For example, when a social security number is not actually written on a "social security number" item in the first execution screen, the processor 430 may not determine a security level with respect to the "social security number" item.

Also, the processor 430 may determine that the ID of the first user has the authority to capture the first execution screen when the security level set with respect to the ID of the first user is higher than the security level of the first execution screen.

On the other hand, the processor 430 may determine that the ID of the first user does not have the authority to capture the first execution screen when the security level of the first execution screen is higher than the security level set with respect to the ID of the first user.

The processor 430 may control capturing of the first execution screen according to the first input based on the authority of the ID of the first user. In detail, when it is determined that the ID of the first user has the authority to capture the first execution screen, the processor 430 may generate a first file by capturing the first execution screen.

Also, upon receiving an output request of the first file or a transmission request of the first file to an external device, the processor 430 may additionally request authentication of the first user through the user interface device 420. For example, the user interface device 420 may display an input window for inputting a password or a personal identification number (PIN). Also, the image forming apparatus 100 may additionally authenticate the first user via tagging using NFC. When the first user is authenticated, the processor 430 may control the first file to be output or to be transmitted to an external device.

Meanwhile, when it is determined that the ID of the first user does not have the authority to capture the first execution screen, the processor 430 may control the user interface device 420 to display a message prohibiting capturing of the first execution screen. For example, the processor 430 may control the user interface device 420 to display a popup window with a phrase "screen capture prohibited".

The processor 430 may execute the capture security program controlling capturing of all or a partial region of the at least one execution screen of the first application. The processor 430 may control the user interface device 420 to display a setup screen for setting items in the capture security program used to control capturing of all or a partial region of the at least one execution screen.

The processor 430 may control the user interface device 420 to display at least one setup screen based on an input of setting the items in the capture security program.

For example, the user interface device 420 may display a first setup screen for setting the first application to permit capturing of only a particular execution screen from among a plurality of execution screens of the first application.

Also, the user interface device 420 may display a second setup screen for setting authority of ID of each of a plurality of users based on profile information of each of the plurality of users capable of logging in to the first application.

Also, the user interface device 420 may display a third setup screen for setting a security level of each piece of data displayed on the plurality of execution screens, based on the service information provided by the first application and the profile information of each of the plurality of users. The third setup screen may include a screen for setting a security level according to the authority of the ID of each of the plurality of users based on the profile information of each of the plurality of users, and a screen for setting the security level of each piece of data displayed on the plurality of execution screens based on the service information provided by the first application.

The user interface device 420 may receive a second input of capturing a first region with respect to a certain portion of the first execution screen. The processor 430 may determine whether the ID of the first user has authority to capture the first region in the first execution screen by comparing a security level of the first region set based on data displayed in the first region and the security level set with respect to the ID of the first user. The processor 430 may control capturing of the first region in the first execution screen according to the second input, based on the authority of the ID of the first user.

Meanwhile, the processor 430 may consider the security level set with respect to the image forming apparatus 100 in priority over the security level set with respect to the ID of the first user while controlling the capturing of the first execution screen. The processor 430 may control the capturing of the first execution screen according to the first input based on a result of comparing the security level set with respect to the image forming apparatus 100 and the security level set with respect to the first execution screen.

The image forming apparatus 100 may include a central operation processor to control overall operations of the memory 410, the user interface device 420, and the processor 430. The central operation processor may be embodied in an array of a plurality of logic gates, or may be embodied in a combination of a general-purpose micro-processor and a memory in which a program executable by the general-purpose micro-processor is stored. It would be obvious to one of ordinary skill in the art that the central operation processor may be embodied in another type of hardware.

Hereinafter, details that could be clearly understood and predicted by one of ordinary skill in the art may be comprehended via general implementation without having to specify each component of the image forming apparatus 100, and the right scope of the disclosure is not limited by a name of a particular component or a physical/logical structure.

FIG. 5 is a diagram for describing processes of controlling, by the image forming apparatus 100, capturing of an execution screen of an application displayed on the user interface device 420 of the image forming apparatus 100, according to an example.

In operation S510, the user interface device 420 of the image forming apparatus 100 may display a first execution screen of a first application to which a first user is logged in.

In operation S520, the user interface device 420 of the image forming apparatus 100 may receive a first input of capturing the first execution screen.

In operation S530, the user interface device 420 of the image forming apparatus 100 may transmit information about the first input to the processor 430 of the image forming apparatus 100.

In operation S540, the processor 430 of the image forming apparatus 100 may determine whether ID of a first user has authority to capture the first execution screen by comparing a security level of the first execution screen and a security level of the first user.

For example, when a security level set with respect to the ID of the first user is higher than the security level of the first execution screen, the processor 430 of the image forming apparatus 100 may determine that the ID of the first user has authority to capture the first execution screen.

On the other hand, when the security level of the first execution screen is higher than the security level set with respect to the ID of the first user, the processor 430 of the image forming apparatus 100 may determine that the ID of the first user does not have authority to capture the first execution screen. Operation S540 will be described in detail later with reference to FIGS. 6 through 8.

In operation S550, the processor 430 of the image forming apparatus 100 may control capturing of the first execution screen according to the first input, based on the authority of the ID of the first user.

In detail, when it is determined that the ID of the first user does not have the authority to capture the first execution screen, the processor 430 of the image forming apparatus 100 may transmit determination of prohibiting capturing of the first execution screen to the user interface device 420 of the image forming apparatus 100, in operation S560.

In operation S570, the user interface device 420 may display a message of prohibiting capturing of the first execution screen in operation S570.

When it is determined that the ID of the first user has the authority to capture the first execution screen, the processor 430 of the image forming apparatus 100 may generate a first file by capturing the first execution screen in operation S580.

In operation S590, the image forming apparatus 100 may output the first file or transmit the first file to an external device.

In relation to the image forming apparatus 100 controlling capturing of an execution screen of an application according to a security level of a user and a security level of data, a "patient management application" is used as an example of the "application" in FIGS. 6 through 8 for convenience. However, it would be obvious to one of ordinary skill in the art that the "application" may be another type of application in addition to the "patient management application".

FIG. 6 is a diagram for describing processes of controlling, by the image forming apparatus 100, capturing of an execution screen of an application according to a security level of a user and security level of data, according to an example.

The image forming apparatus 100 may control capturing of the execution screen displayed on the user interface device 420 of the image forming apparatus 100, based on the security level of the user and the security level of the data.

Patients may be systematically managed by using a patient management application. The patient management application may store and manage personal information of a patient, the personal information including biographical information and medical records of the patient.

The user interface device 420 of the image forming apparatus 100 may execute the patient management application installed in the image forming apparatus 100. Users may be a doctor 611, a nurse 612, a patient, and an ordinary person 613, wherein each of the users may log in to the user interface device 420 of the image forming apparatus 100 by using ID to execute the patient management application.

As shown in FIG. 6, the user interface device 420 of the image forming apparatus 100 may display a patient list 601. The patient list 601 may include a name 602 and a room number 603 of a patient, but is not limited thereto.

The image forming apparatus 100 may limitedly permit capturing of the execution screen displayed on the user interface device 420 according to the security level of the user and the security level of the execution screen, by executing a capture security program.

For example, in relation to the patient management application used by a hospital to manage patients, data including patient information may be classified into a first security level, a second security level, and a third security level based on security necessity, wherein security levels may be further subdivided. Data set to the first security level may have higher security necessity than data set to the second security level, and data set to the second security level may have higher security necessity than data set to the third security level.

Also, setting of a security level may be updated when necessary. Accordingly, the data set to the third security level may be re-set to the first security level based on security necessity.

Data including unique personal information of a patient, such as a social security number, and diagnostic information (for example, an examination result of an examination image of the patient) of a patient, such as the examination image or the examination result of the patient, may be set to the first security level. Also, data including basic information (for example, the name 602, the room number 603, and a department treating the patient) and prescription information of the patient may be set to the second security level. Also, data including hospital guide information may be set to the third security level.

Also, users capable of accessing information of a patient and logging in to the patient management application may be classified into a first security level, a second security level, and a third security level based on work responsibility details of the users or degrees of association with the patient, wherein security levels may be further subdivided. A criterion for determining a security level may be set based on a certain standard. In other words, a security level may be set with respect to an ID of each user, and each user may access data of a security level equal to or lower than the security level set with respect to the ID of each user.

In detail, a user set to the first security level may access data set to the first through third security levels. Also, a user set to the second security level may access data set to the second and third security levels. Also, a user set to the third security level may only access data set to the third security level.

ID of the doctor 611 may be set to the first security level so as to access data including diagnostic information of a patient, such as an examination image and an examination result. ID of the nurse 612 may be set to the second security level so as to access data including basic information and prescription information of a patient. ID of the ordinary person 613 other than the doctor 611 and the nurse 612 may be set to the third security level so as to access only data including hospital guide information.

As shown in FIG. 6, the user interface device 420 of the image forming apparatus 100 may display the patient list 601 including the name 602 and the room number 603 of a patient. As described above, the name 602 and the room number 603 have the second security level, the image forming apparatus 100 may determine a security level of an execution screen including the patient list 601 to be the second security level.

Accordingly, when the doctor 611 or the nurse 612 logs in to the patient management application by using his/her ID and tries to capture the execution screen including the patient list 601, the image forming apparatus 100 may permit capturing of the execution screen.

However, when the ordinary person 613 logs in to the patient management application by using his/her ID and tries to capture the execution screen including the patient list 601, the image forming apparatus 100 may prohibit capturing of the execution screen.

FIG. 7 is a diagram for describing processes of controlling, by the image forming apparatus 100, capturing of an execution screen of an application according to a security level of a user and security level of data, according to another example.

As shown in FIG. 7, the user interface device 420 of the image forming apparatus 100 may display, in detail, patient information 701 of a first patient. The user interface device 420 may display, on one execution screen, personal information 702 about a name and age of a patient, diagnostic information 703 about an examination image of the patient and an examination result on the examination image, and prescription information 704 about a prescription of the patient.

Meanwhile, the image forming apparatus 100 may determine a security level of a first execution screen based on first data having highest security level from among security levels of pieces of data displayed on the first execution screen.

Also, the image forming apparatus 100 may determine whether substantive information about the first data is actually displayed on the first execution screen while determining the security level of the first data displayed on the first execution screen. For example, when a social security number is not actually written on a "social security number" item in the first execution screen, the image forming apparatus 100 may not determine a security level with respect to the "social security number" item.

As described above, since the personal information 702 and the prescription information 704 have the second security level and the diagnostic information 703 has the first security level, the image forming apparatus 100 may determine a security level of an execution screen including the patient information 701 to be the first security level.

Accordingly, when the doctor 611 tries to capture the execution screen including the patient information 701 by logging in to the patient management application using his/her ID, the image forming apparatus 100 may permit capturing of the execution screen.

On the other hand, when the nurse 612 or the ordinary person 613 tries to capture the execution information including the patient information 701 by logging in to the patient management application using his/her ID, the image forming apparatus 100 may prohibit capturing of the execution screen.

FIG. 8 is a diagram for describing controlling, by the image forming apparatus 100, capturing of a certain region of an execution screen of an application, according to an example.

As shown in FIG. 8, the user interface device 420 of the image forming apparatus 100 may display an execution screen including the patient list 601 and the patient information 701 of the first patient.

As described with reference to FIG. 6, the patient list 601 may include information about the name 602 and the room number 603, but is not limited thereto.

Also, as described with reference to FIG. 7, the patient information 701 of the first patient may include the personal information 702 about a name and an age of the first patient, the diagnostic information 703 about an examination image of the first patient and an examination result on the examination image, and the prescription information 704 about a prescription of the first patient.

Meanwhile, the image forming apparatus 100 may determine a security level of a first execution screen based on first data having a highest security level from among security levels of pieces of data displayed on the first execution screen.

Also, the user interface device 420 of the image forming apparatus 100 may receive a second input of capturing a first region with respect to a portion of the first execution screen. The image forming apparatus 100 may determine whether ID of a user logged in to an application has authority to capture the first region of the first execution screen by comparing a security level of the first region set based on data displayed in the first region and a security level set with respect to the ID of the user logged in to the application. The image forming apparatus 100 may control capturing of the first region of the first execution screen according to the second input based on whether the ID of the user has the authority to capture the first region.

For example, the nurse 612 may try to capture the patient list 601, the name 602, and the room number 603 displayed on the execution screen of FIG. 8 by logging in to a patient management application with his/her ID. Since a security level of the ID of the nurse 612 is set to a second security level and security levels of the patient list 601, the name 602, and the room number 603 are set to the second security level, the image forming apparatus 100 may permit the nurse 612 to capture the patient list 601, the name 602, and the room number 603.

As another example, the nurse 612 may try to capture the patient information 701, the personal information 702, the diagnostic information 703, and the prescription information 704 displayed on the execution screen of FIG. 8 by logging in to the patient management application with his/her ID.

As described above with reference to FIG. 7, since the personal information 702 and the prescription information 704 have a second security level and the diagnostic information 703 has a first security level, the image forming apparatus 100 may determine security levels of the patient information 701, the personal information 702, the diagnostic information 703, and the prescription information 704 to be the first security level. Since the security level of the ID of the nurse 612 is set to the second security level and the security levels of the patient information 701, the personal information 702, the diagnostic information 703, and the prescription information 704 are set to the first security level, the image forming apparatus 100 may prohibit the nurse 612 from capturing the patient information 701, the personal information 702, the diagnostic information 703, and the prescription information 704.

FIG. 9 is a diagram for describing processes of setting, by the image forming apparatus 100, items in a security program controlling screen capturing, according to an example.

In operation S910, the processor 430 of the image forming apparatus 100 may store a capture security program. The capture security program may be a program for controlling capturing of all or a partial region of at least one execution screen of at least one application. The capture security program may be downloaded from an external server or an external device.

In operation S920, the processor 430 of the image forming apparatus 100 may install and execute the capture security program.

In operation S930, the processor 430 of the image forming apparatus 100 may request to display a setup screen of the capture security program. In other words, the processor 430 of the image forming apparatus 100 may control the user interface device 420 of the image forming apparatus 100 to display the setup screen of the capture security program.

In operation S940, the user interface device 420 of the image forming apparatus 100 may display the setup screen of the capture security program. The setup screen may be a UI for setting items in the capture security program used to control capturing of the all or a partial region of the at least one execution screen.

The user interface device 420 of the image forming apparatus 100 may display the setup screen of the capture security program related to a first application.

For example, a first setup screen may be a UI for setting the first application to permit capturing only a particular execution screen from among a plurality of execution screens of the first application.

Also, a second setup screen may be a UI for setting authority of ID of each of a plurality of users capable of logging in to the first application, based on profile information of each of the plurality of users.

Also, a third setup screen may be a UI for setting a security level with respect to each piece of data displayed on the plurality of execution screens, based on service information provided by the first application and the profile information of each of the plurality of users.

in detail, the third setup screen may include a screen for setting a security level according to the authority of ID of each of the plurality of users based on the profile information of each of the plurality of users, and a screen for setting a security level with respect to each piece of data displayed on the plurality of execution screens based on the service information provided by the first application.

In operation S950, the user interface device 420 of the image forming apparatus 100 may receive a user input with respect to setting an item in the capture security program.

In operation S960, the user interface device 420 of the image forming apparatus 100 may transmit the user input to the processor 430 of the image forming apparatus 100.

In operation S970, the processor 430 of the image forming apparatus 100 may set an item of the capture security program based on the user input.

FIG. 10 illustrates screens of the image forming apparatus 100 set to control capturing of an execution screen of an application according to the execution screen, according to an example.

As shown in FIG. 10, the image forming apparatus 100 may execute a capture security program, and display a setup screen 1010 for setting items in the capture security program used to control screen capturing on the user interface device 420 of the image forming apparatus 100. In other words, the image forming apparatus 100 may display the setup screen 1010 including items related to a capture environment setting. The items related to the capture environment setting may include an application, a user, data, and a local apparatus, but are not limited thereto.

The image forming apparatus 100 may receive an input of selecting an "application" item through the user interface device 420. According to the input of selecting the "application" item, the image forming apparatus 100 may display, on the user interface device 420, a setup screen 1020 for permitting capturing with respect to a particular execution screen from among a plurality of execution screens of an application.

As shown in FIG. 10, the setup screen 1020 may include an icon for permitting capturing of all execution screens according to execution of the application, an icon for permitting capturing of only a particular execution screen from the all execution screens according to execution of the application, and an icon for prohibiting capturing of the all execution screens according to execution of the application. Also, when the icon for permitting capturing of only the particular execution screen is selected, an input window into which a screen that is permitted to be captured is input may be displayed.

The capture environment setting may be independently set with respect to each of a plurality of applications installed in the image forming apparatus 100.

FIG. 11 illustrates screens of the image forming apparatus 100 set to control capturing of an execution screen of an application according to users, according to an example.

As shown in FIG. 11, the image forming apparatus 100 may display the setup screen 1010 including the items related to the capture environment setting. The image forming apparatus 100 may receive an input of selecting a "user" item through the user interface device 420. According to the input of selecting the "user" item, the image forming apparatus 100 may display, on the user interface device 420, a setup screen 1030 for setting authority of ID of each of a plurality of users capable of logging in to an application, based on profile information of each of the plurality of users.

As shown in FIG. 11, the plurality of users capable of logging in to the application may be classified into a manager, a member, and a non-member. The manager may be permitted to capture all screens of the application. Also, the member may be permitted to capture a my page screen and a basic information screen of the application. Also, the non-member may be prohibited from capturing all screens of the application.

FIG. 12 illustrates screens of the image forming apparatus 100 set to control capturing of an execution screen of an application according to data, according to an example.

As shown in FIG. 12, the image forming apparatus 100 may display the setup screen 1010 including items related to a capture environment setting. The image forming apparatus 100 may receive an input of selecting a "data" item through the user interface device 420. According to the input of selecting the "data" item, the image forming apparatus 100 may display, on the user interface device 420, a setup screen 1040 for setting a security level of each piece of data displayed on a plurality of execution screens, based on service information provided by an application and profile information of each of a plurality of users.

The setup screen 1040 may include a screen for setting a security level according to authority of ID of each of the plurality of users based on the profile information of each of the plurality of users. As shown in FIG. 12, a manager may be set to a first security level, a member may be set to a second security level, and a non-member may be set to a third security level.

Also, the setup screen 1040 may include a screen for setting a security level with respect to each piece of data displayed in a patient management application, based on service information provided by the patient management application.

As shown in FIG. 12, data including unique personal information of a patient, such as a social security number, and diagnostic information of the patient, such as an examination image and an examination result, may be set to a first security level. Also, data including basic information and prescription information of the patient may be set to a second security level. Also, data including hospital guide information may be set to a third security level. Also, the setup screen 1040 may display a separate icon for adding or deleting data according to security levels.

FIG. 13 is a diagram for describing processes of controlling, by a device 1300 connectable to the image forming apparatus 100, capturing of an execution screen of an application displayed on the device 1300, according to an example.

In operation S1310, the device 1300 may display a first execution screen of a first application to which a first user logged in.

In operation S1320, the device 1300 may receive a first input of capturing the first execution screen.

In operation S1330, the device 1300 may determine whether ID of the first user has authority to capture the first execution screen by comparing a security level of the first execution screen and a security level of the first user.

In operation S1340, the device 1300 may control capturing of the first execution screen according to the first input, based on the authority of ID of the first user.

In detail, in operation S1350, when the ID of the first user does not have authority to capture the first execution screen, the device 1300 may display a message of prohibiting capturing of the first execution screen.

In operation S1360, when the ID of the first user has authority to capture the first execution screen, the device 1300 may generate a first file by capturing the first execution screen.

In operation S1370, the device 1300 may request the image forming apparatus 100 to output the first file.

In operation S1380, the image forming apparatus 100 may output the first file according to the request of the device 1300.

FIG. 14 is a diagram for describing processes of controlling, by the server 300 managing first through third image forming apparatuses 100-1 through 100-3, capturing of an execution screen of an application of each of the first through third image forming apparatuses 100-1 through 100-3, according to an example.

The server 300 may set controlling of capturing of an execution screen of an application displayed on a user interface device of each of the first through third image forming apparatuses 100-1 through 100-3, with respect to the first through third image forming apparatuses 100-1 through 100-3.

As shown in FIG. 14, the server 300 may display a setup screen 1410 set to control capturing of an execution screen of an application in each of the first through third image forming apparatuses 100-1 through 100-3 connected to the server 300.

The setup screen 1410 may include a screen for setting a security level of each of the first through third image forming apparatuses 100-1 through 100-3. As shown in FIG. 14, the first image forming apparatus 100-1 may be set to a first security level, the second image forming apparatus 100-2 may be set to a second security level, and the third image forming apparatus 100-3 may be set to a third security level.

The setup screen 1410 may include a screen for setting a security level with respect to each piece of data displayed on a patient management application, based on service information provided by the patient management application. Details that overlap those of FIG. 12 are not provided again.

The server 300 may control each of the first through third image forming apparatuses 100-1 through 100-3 according to a capture control setting of the execution screen of the application. For example, the server 300 may permit the first image forming apparatus 100-1 to capture data corresponding to first through third security levels. Also, the server 300 may permit the second image forming apparatus 100-2 to capture data corresponding to the second and third security levels. Also, the server 300 may permit the third image forming apparatus 100-3 to capture data corresponding to the third security level. When the third image forming apparatus 100-3 tries to capture data corresponding to the first or second security level, the server 300 may not permit the capturing.

FIG. 15 is a flowchart of a method of controlling, by the image forming apparatus 100, capturing of an execution screen of an application displayed on the user interface device 420 of the image forming apparatus 100, according to an example.

In operation S1510, the image forming apparatus 100 may display a first execution screen of a first application logged in with ID of a first user.

In operation S1520, the image forming apparatus 100 may receive a first input of capturing the first execution screen. Also, the image forming apparatus 100 may receive a second input of capturing a first region with respect to a portion of the first execution screen.

In operation S1530, the image forming apparatus 100 may determine whether the ID of the first user has authority to capture the first execution screen by comparing a security level of the first execution screen set based on data displayed on the first execution screen and security level set with respect to the ID of the first user.

When the security level set with respect to the ID of the first user is higher than the security level of the first execution screen, the image forming apparatus 100 may determine that the ID of the first user has the authority to capture the first execution screen. However, when the security level of the first execution screen is higher than the security level set with respect to the ID of the first user, the image forming apparatus 100 may determine that the ID of the first user does not have the authority to capture the first execution screen.

The image forming apparatus 100 may determine a security level of each piece of data displayed on the first execution screen based on service information provided by the first application, and determine the security level of the first execution screen based on first data having a highest security level from the security level of each piece of the data.

Also, the image forming apparatus 100 may determine whether substantive information about the data is actually displayed on the first execution screen while determining the security level of the data displayed on the first execution screen. For example, when a social security number is not actually written on a "social security number" item in the first execution screen, the image forming apparatus 100 may not determine a security level with respect to the "social security number" item.

Also, when the first region of the first execution screen is captured, the image forming apparatus 100 may determine whether the ID of the first user has authority to capture the first region of the first execution screen by comparing the security level set with respect to the ID of the first user and a security level of the first region set based on the data displayed in the first region.

In operation S1540, the image forming apparatus 100 may control capturing of the first execution screen according to the first input, based on the authority of the ID of the first user.

When it is determined that the ID of the first user has the authority to capture the first execution screen, the image forming apparatus 100 may generate a first file by capturing the first execution screen. The image forming apparatus 100 may receive a request to output the first file or a request to transmit the first file to an external device.

The image forming apparatus 100 may additionally request authentication of the first user through the user interface device 420, according to the request. For example, the user interface device 420 may display an input window for inputting a password or PIN. Also, the image forming apparatus 100 may additionally authenticate the first user via tagging using NFC. When the first user is authenticated, the image forming apparatus 100 may output the first file or transmit the first file to the external device.

However, when it is determined that the ID of the first user does not have the authority to capture the first execution screen, the image forming apparatus 100 may display, on the user interface device 420, a message prohibiting capturing of the first execution screen.

Meanwhile, the image forming apparatus 100 may control capturing of the first execution screen by considering a security level set with respect to the image forming apparatus 100 in priority over the security level set with respect to the ID of the first user. The image forming apparatus 100 may control capturing of the first execution screen according to the first input based on a result of comparing the security level set with respect to the image forming apparatus 100 and the security level of the first execution screen.

FIG. 16 is a flowchart of a method of setting, by the image forming apparatus 100, items in a security program for controlling screen capturing, according to an example.

In operation S1610, the image forming apparatus 100 may execute a capture security program. The capture security program may be a security program controlling capturing of all or a partial region of at least one execution screen of at least one application.

In operation S1620, the image forming apparatus 100 may display, on the user interface device 420 of the image forming apparatus 100, a setup screen for setting items in the capture security program used to control capturing of the all or a partial region of the at least one execution screen. The image forming apparatus 100 may display, on the user interface device 420, the setup screen for setting the items in the capture security program to control capturing related to a first application.

For example, the image forming apparatus 100 may display, on the user interface device 420 of the image forming apparatus 100, at least one setup screen from among a first setup screen for setting the first application to permit capturing of only a certain execution screen from among a plurality of execution screens of the first application, a second setup screen for setting authority of ID of each of a plurality of users capable of logging in to the first application, based on profile information of each of the plurality of users, and a third setup screen for setting a security level of each piece of data displayed on the plurality of execution screens, based on service information provided by the first application and the profile information of each of the plurality of users.

The third setup screen may include a screen for setting a security level according to the authority of ID of each of the plurality of users, based on the profile information of each of the plurality of users, and a screen for setting a security level of each piece of data displayed on the plurality of execution screens, based on the service information provided by the first application, but is not limited thereto.

In operation S1630, the image forming apparatus 100 may set the items in the capture security program based on a user input.

The image forming apparatus 100 described above may include a hardware component, a machine readable instructions component, and/or a combination of the hardware and machine readable instructions components. For example, apparatuses and components described in examples may be embodied by using a general-purpose computer or a special-purpose computer or any combination thereof, such as a processor, a controller, an arithmetic logic unit (ALU), a digital signal processor, a micro-computer, a field programmable array (FPA), a programmable logic unit (PLU), a micro-processor, or any other apparatus capable of executing and responding to an instruction.

While examples have been described with reference to the figures, it will be understood by those of ordinary skill in the art that various changes in form and details may be made therein. For example, a suitable result may be obtained even when operations of a method are performed in a different order and/or components, such as a system, a structure, an apparatus, and a circuit described above, are combined in a different manner or substituted with other components or equivalents.

Accordingly, the scope of the disclosure should not be limited by the above examples, and may be defined by the following claims or equivalents.

The invention claimed is:

1. An image forming apparatus comprising:
a memory to store at least one application;
a user interface device to
display an execution screen to display information of a first application, among the at least one application, to which a user is logged in with an identification (ID) of the user, and
receive a first input of capturing the execution screen; and
a processor to
determine an authority of the ID of the user to capture the displayed execution screen by comparing a security level of the execution screen set based on the information of the first application displayed on the execution screen and a security level of the user set with respect to the ID of the user, and
in response to the first input, control the capturing of the execution screen, based on the determined authority of the ID of the user, before a capturing of the displayed execution screen.

2. The image forming apparatus of claim 1, wherein
the execution screen includes displayed pieces of data and service information provided by the first application, and
the processor is to
determine a security level of each piece of data displayed on the execution screen based on the service information provided by the first application, and
determine the security level of the execution screen based on a first piece of data among the pieces of data having a highest security level from among the security level of each piece of data.

3. The image forming apparatus of claim 1, wherein the processor is to,
generate a file obtained by capturing the execution screen, when determined that the ID of the user has the authority to capture the execution screen, and
control the user interface device to display a message of prohibiting the capturing of the execution screen, when determined that the ID of the user does not have the authority to capture the execution screen.

4. The image forming apparatus of claim 1, wherein the processor is to,
execute a second application to control the user interface device to display a setup screen to set items in the second application to control capturing all regions or a partial region of the execution screen of the first application.

5. The image forming apparatus of claim 4, wherein the setup screen includes any one or combinations of:
a first setup screen to set the first application to permit capturing the execution screen from among a plurality of execution screens of the first application;
a second setup screen to set an authority of an ID of each of a plurality of users capable of logging in to the first application, based on profile information of each of the plurality of users; or
a third setup screen to set a security level of each piece of data displayed on the plurality of execution screens, based on service information provided by the first application and the profile information of each of the plurality of users.

6. The image forming apparatus of claim 5, wherein the third setup screen comprises:
a screen to set a security level according to the authority of ID of each of the plurality of users, based on the profile information of each of the plurality of users; and a screen to set a security level of each piece of data displayed on the plurality of execution screens, based on the service information provided by the first application.

7. The image forming apparatus of claim 1, wherein the memory is to store a second application to control capturing all regions or a partial region of the execution screen.

8. The image forming apparatus of claim 1, wherein
the user interface device is to receive a second input of capturing a first partial region among a plurality of partial regions of the execution screen, and
the processor is to,
determine the authority of the ID of the user to capture the first partial region in the execution screen by comparing a security level of the first partial region set based on data among the information displayed in the first partial region and the security level of the user set with respect to the ID of the user.

9. The image forming apparatus of claim 3, wherein the processor is to:
receive an output request of the file or a transmission request of the file to an external device,
request authentication of the user through the user interface device, in response to the output request or the transmission request of the file, and
output the file or transmit the file to the external device when the user is successfully authenticated.

10. The image forming apparatus of claim 1, wherein the processor is to: consider a security level set with respect to the image forming apparatus in priority over the security level set with respect to the ID of the user, to control the capturing the execution screen, to control the capturing the execution screen, based on the security level set with respect to the image forming apparatus and the security level of the execution screen.

11. A non-transitory computer-readable recording medium having recorded thereon a program which, when executed by a computer, controls capturing screen information of an application displayed on a display device for an image forming apparatus, by:
receiving a first input to capture the screen information;
determining an authority of an ID of a user logged into the application to capture the displayed screen information, in response to a set security level of the screen information corresponding to a security level of the user set with respect to the ID of the user; and
in response to the first input, controlling the capturing the screen information, based on the authority of the ID of the user, before the capturing the screen information.

12. The non-transitory computer-readable recording medium of claim 11, wherein
the displayed screen information includes displayed pieces of data and service information provided by the application, and
the determining the authority of the ID of the user comprises
determining a security level of each piece of data displayed on the displayed screen information screen based on the service information provided by the first application, and
determining the security level of the displayed screen information based on a first piece of the data among the pieces of data having a highest security level from among the security level of each piece of data.

13. The non-transitory computer-readable recording medium of claim 11, wherein the controlling the capturing the screen information comprises:
generating a file obtained by capturing the displayed screen information when determined that the ID of the user has the authority to capture the displayed screen information; and
controlling the display to display a message of prohibiting the capturing of the displayed screen information screen when determined that the ID of the user does not have the authority to capture the displayed screen information.

14. The non-transitory computer-readable recording medium of claim 11, wherein the program which, when executed, controls the capturing the screen information by executing a second application to control the display to display a setup screen to set items in the second application to control the capturing all regions or a partial region of the displayed screen information.

15. A device connectable to an image forming apparatus, the device comprising:
a memory to store at least one application;
a display to display an execution screen to display information of a first application from among the at least one application, to which a user logged in with an identification (ID) of the user;
an input device to receive an input of capturing the execution screen; and
a processor to
determine an authority of the ID of the user to capture the displayed execution screen by comparing a security level of the execution screen set based on the information of the first application displayed on the execution screen and a security level of the user set with respect to the ID of the user, and
in response to the input, control capturing of the execution screen according to the input, based on the determined authority of the ID of the user, before a capturing of the displayed execution screen.

* * * * *